(12) United States Patent
Leroy

(10) Patent No.: US 11,598,623 B2
(45) Date of Patent: Mar. 7, 2023

(54) GROUND-FIXING SYSTEM FOR A SENSOR HOUSING

(71) Applicant: COMPAGNIE GENERALE DES ETABLISSEMENTS MICHELIN, Clermont-Ferrand (FR)

(72) Inventor: Vianney Leroy, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 481 days.

(21) Appl. No.: 16/639,195

(22) PCT Filed: Aug. 8, 2018

(86) PCT No.: PCT/IB2018/055983
§ 371 (c)(1),
(2) Date: Feb. 14, 2020

(87) PCT Pub. No.: WO2019/034968
PCT Pub. Date: Feb. 21, 2019

(65) Prior Publication Data
US 2021/0372761 A1    Dec. 2, 2021

(30) Foreign Application Priority Data
Aug. 14, 2017    (FR) .................................. 1770856

(51) Int. Cl.
*G01B 5/00* (2006.01)
*F16B 5/10* (2006.01)
(Continued)

(52) U.S. Cl.
CPC .............. *G01B 5/0004* (2013.01); *F16B 5/10* (2013.01); *F16B 21/02* (2013.01); *G01B 5/0007* (2013.01); *G01B 5/068* (2013.01); *G01M 17/02* (2013.01)

(58) Field of Classification Search
None
See application file for complete search history.

(56) References Cited

U.S. PATENT DOCUMENTS 2,878,542 A  *  3/1959  Summers .................. F16B 5/10
                                                       411/555
3,109,214 A  *  11/1963  Clay ....................... F16B 21/02
                                                       411/407
(Continued)

FOREIGN PATENT DOCUMENTS

DE    10 2008 048 318 A1    9/2010
EP          2 759 718 A1    7/2014
(Continued)

OTHER PUBLICATIONS

International Search Report dated Oct. 17, 2018, in corresponding PCT/IB2018/055983 (4 pages).

*Primary Examiner* — Christopher W Fulton
(74) *Attorney, Agent, or Firm* — Venable LLP

(57) ABSTRACT

A ground-fixing system for a tire characteristics sensor housing (10) comprises: a fixing plate (1) comprising a plurality of recesses (2) of a given profile distributed over the surface of the fixing plate; and a plurality of fixing pins (3) of substantially corresponding profile, similarly distributed on a fixing face of said sensor housing (10), the shapes and dimensions of the recesses (2) and of the pins (3) for fixing being provided so as to allow, on the one hand, in a position of insertion of the pins, engagement of the latter in said recesses and, on the other hand, in a locking position of the pins, fixing of the sensor housing (10) on the fixing plate (1).

11 Claims, 3 Drawing Sheets

(51) Int. Cl.
*F16B 21/02* (2006.01)
*G01B 5/06* (2006.01)
*G01M 17/02* (2006.01)

(56) References Cited

U.S. PATENT DOCUMENTS

| | | | | |
|---|---|---|---|---|
| 3,463,479 | A | * | 8/1969 | Hennessey ............ B23Q 3/103 33/549 |
| 5,115,109 | A | * | 5/1992 | Fisher ...................... G01P 3/66 73/146 |
| 5,289,718 | A | * | 3/1994 | Mousseau ............ G01M 17/02 73/146 |
| 7,578,180 | B2 | * | 8/2009 | Lionetti .................. G01B 7/26 73/146 |
| 9,068,584 | B2 | * | 6/2015 | McDowell ............ F16B 19/008 |
| 9,194,413 | B2 | | 11/2015 | Christoph et al. |
| 9,302,851 | B2 | * | 4/2016 | Esser ...................... B65G 13/11 |
| 10,052,212 | B2 | * | 8/2018 | Fiechter ................ A61F 2/4465 |
| 10,071,796 | B2 | | 9/2018 | Esser et al. |
| 10,113,855 | B2 | | 10/2018 | Ledoux et al. |
| 10,876,826 | B2 | * | 12/2020 | Ledoux .................... G01B 7/26 |
| 2005/0288835 | A1 | * | 12/2005 | Holland ................ G01M 17/02 701/1 |
| 2012/0000291 | A1 | | 1/2012 | Christoph et al. |
| 2012/0124792 | A1 | * | 5/2012 | Ooki ...................... F16B 5/0642 24/606 |
| 2014/0202824 | A1 | | 7/2014 | Esser et al. |
| 2016/0153763 | A1 | | 6/2016 | Ledoux et al. |
| 2016/0169657 | A1 | * | 6/2016 | Ledoux ................ G01M 17/02 73/146 |
| 2016/0214703 | A1 | | 7/2016 | Esser et al. |

FOREIGN PATENT DOCUMENTS

| | | | |
|---|---|---|---|
| WO | WO-2007113138 A1 | * 10/2007 | ............. F16B 21/02 |
| WO | 2014/202747 A1 | 12/2014 | |
| WO | 2015/011257 A1 | 1/2015 | |

* cited by examiner

GROUND-FIXING SYSTEM FOR A SENSOR HOUSING

TECHNICAL FIELD OF THE INVENTION

The present invention relates to a ground-fixing system for a tyre characteristics sensor housing.

PRIOR ART

Document WO 2014202747 describes a system for measuring the thickness of a layer of rubbery material of a tyre. It takes the form of a housing that is to be fixed to the ground. In use, this type of housing is subject to high stresses owing to numerous vehicles of all types, including trucks, driving over it. Despite these high stresses, the housing must not move or lift. The housings are therefore often fixed to the ground by means of significant infrastructure in the ground. This infrastructure involves major work, which is both time-consuming and costly. Moreover, if a housing proves to be badly positioned, any repositioning also requires major work, involving heavy equipment. There is therefore a need to make it possible to easily fix and reposition the measurement housings, with simplified implementation.

The invention provides various technical means for alleviating these various drawbacks.

SUMMARY OF THE INVENTION

First of all, a first object of the invention is to provide a fixing system for a housing, for the simple and rapid measurement of tyre characteristics, to be installed in the ground.

Another object of the invention is to provide a fixing system for a housing for measuring tyre characteristics, the installation of which can be performed using standard tools.

Another object of the invention is to provide an economical and easily industrializable fixing system.

Another object of the invention is to provide a fixing system which does not disturb the operation of the measurement housing.

Another object of the invention is to provide a fixing system which permits quick and easy lateral repositioning of the housing, at a plurality of potential locations.

To do this, the invention provides a ground-fixing system for a tyre characteristic sensor housing, the housing fixing being designed to withstand the severe stresses associated with numerous vehicles driving over the housing, said ground-fixing system comprising:
  i) a fixing plate comprising a plurality of recesses of a given profile distributed over the surface of the fixing plate;
  ii) a plurality of fastening pins suitable for cooperating with the profiles of the recesses of the fixing plate, similarly distributed on a fixing face of said sensor housing with a degree of freedom in rotation so as to allow the pins to be inserted and immobilized by simple rotation in the corresponding recesses;
  iii) the shapes and dimensions of the recesses and of the pins for fixing being provided so as to allow, on the one hand, in a position of insertion of the pins, engagement of the latter in said recesses and, on the other hand, in a locking position of the pins resulting from a rotation of said pins, fixing of the sensor housing on the fixing plate.

These features make it possible to create a fixing system that is very simple, inexpensive and robust, with almost instantaneous installation and repositioning of the housing.

The expression "suitable for cooperating with the profiles of the recesses of the fixing plate", is to be understood as "profiles substantially corresponding to or compatible with those of the recesses of the fixing plate".

Advantageously, the angular difference between the insertion position and the locking position is less than 300 degrees, and preferably less than or equal to 180 degrees, and even more preferably substantially 90 degrees. This feature simple and rapid locking or unlocking.

Many profiles can be provided, such as an oblong, or star-shaped, or cross-shaped, or T-shaped profile.

According to one advantageous embodiment, the given profile is oblong, and each pin comprises two edges that are substantially straight and mutually parallel and two substantially opposite curved edges with concave faces. In this case, the pin has a "bi-conical" shape, with an oblong upper profile.

According to yet another advantageous embodiment, the shape and the dimensions of the recesses of the fixing plate are suitable for the insertion of a pin and for locking same by rotation of substantially a quarter turn.

This feature makes it possible to obtain a part that is simple to produce, for example by moulding, and allows "quarter-turn" rotation locking.

Advantageously, the recesses have an oblong profile with two curved edges with convex faces, profiles and dimensions that are substantially complementary to the curved edges with concave faces of the pins, to allow the pins to engage with the recesses when in the locking mode.

Advantageously, each pin comprises at least one immobilizing means that limits or prevents rotation.

This feature serves to avoid unintentional unlocking of the pins.

According to various variants, the immobilizing means consists either of a plurality of studs disposed on the face opposite the sensor housing, or of at least one flexible strip, or of at least one friction bar.

The bar is advantageously created with a high coefficient of friction.

Also advantageously, the fixing plate has a width greater than that of the sensor housing, the plurality of oblong recesses being distributed over substantially the entire width of the plate.

These features make it possible to install and fix the housing at different longitudinal positions of the plate, as required. This results in great modularity.

DESCRIPTION OF THE FIGURES

All the embodiment details are given in the description which follows, supplemented by FIGS. 1 to 8, which are given solely for the purposes of nonlimiting examples and in which.

DETAILED DESCRIPTION OF THE INVENTION

Figure 1:
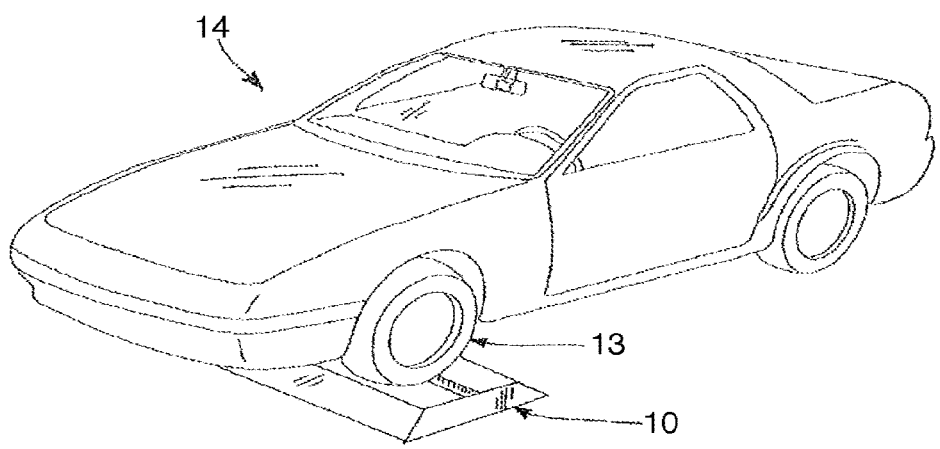
FIG. 1 is a schematic representation of a known system for measuring tyre parameters at the point when a vehicle drives over the system housing.

FIG. 1 illustrates an example of a known system 10 for measuring the thickness of a layer of rubbery material of a tyre 13 of a vehicle 14, such as that described in document WO2014202747. When the vehicle 14 drives over the housing, sensors make it possible to carry out one or more measurements, such as measuring the tread thickness of the tyre 13. To carry out the measurements, the device is preferably placed in a location that facilitates the vehicles 14 driving over it. The method by which the housing is fixed is therefore advantageously designed to withstand the severe stresses associated with many vehicles driving over it. These stresses require that fixing be reliable and durable, as described in the following figures.

Figure 2:
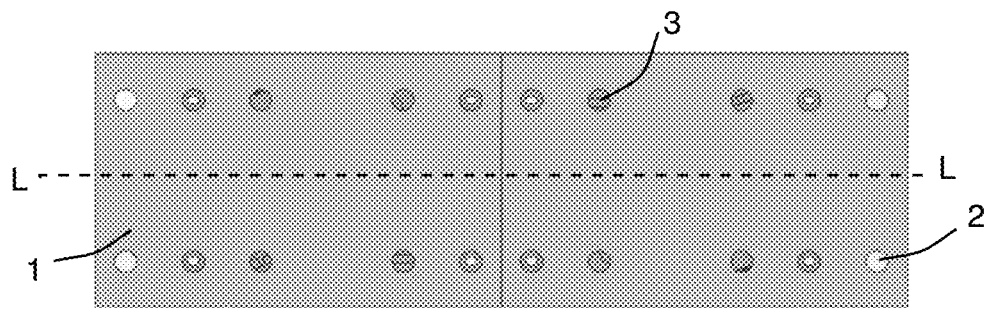
FIG. 2 is a top view of an exemplary fixing plate.

FIG. 2 illustrates an exemplary fixing plate 1. In this example, the plate is divided into two parts joined to each other to provide a larger width. The plate 1 is fixed to the ground by conventional means, such as glue. The plate comprises a plurality of recesses 2. In the illustrated example, the housings are aligned in the longitudinal direction of the plate, parallel to the edges and spaced regularly. Each of the recesses 2 can accommodate a fixing pin 3. The length of the plate 1 is preferably greater than that of the measurement housing 10 that is to be fixed, and the number of recesses 2 is greater than the number of pins to be received in order to allow the housing to be positioned at a plurality of locations along the longitudinal axis L-L of the plate 1. The geometry of the plate 1 and the installation method then make it possible to easily reposition the system by a few centimetres to best match the statistical distribution of the drive-over events, which becomes known once the system has been in use for a time.

Figure 3:
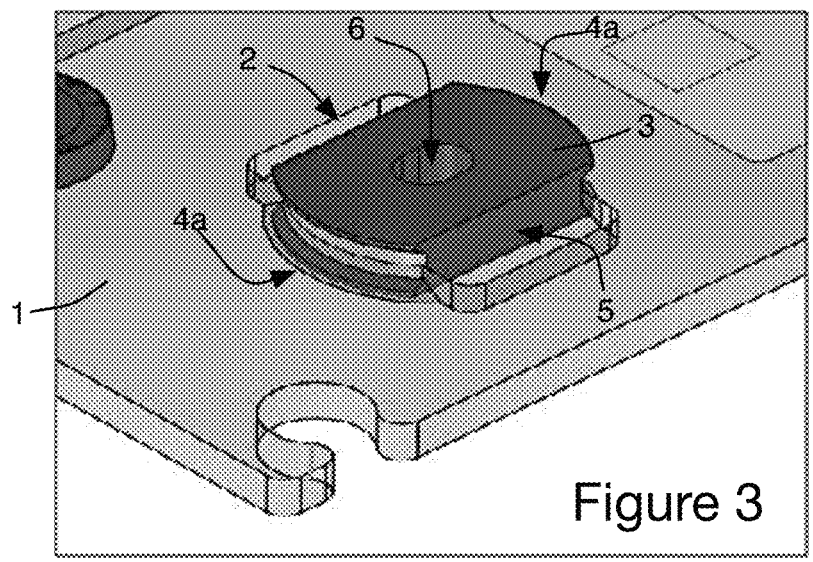
FIG. 3 is a perspective view of an exemplary fixing pin in the locking position on a plate.

FIG. 3 illustrates an exemplary embodiment of a pin 3 inserted into a recess 2 of a plate 1. The fixing pin 3 and the recess 2 are of substantially corresponding shapes and dimensions. In the illustrated examples, the profiles are oblong. Other profiles can be used, such as star-shaped, "T", "X", etc. The corresponding shapes allow on the one hand easy insertion and removal of the pegs in the recesses.

In the illustrated examples, the oblong pin 3 has two curved edges with opposite-arranged concave faces 4a, and two edges 5 that are substantially straight and substantially parallel to each other, also arranged in an opposite manner. An opening 6 is provided in the centre of the pin 3. This opening allows for example for the insertion of a tool that serves for positioning the pin in the desired position by rotation, either in the insertion position or in the locking position.

Figure 4:
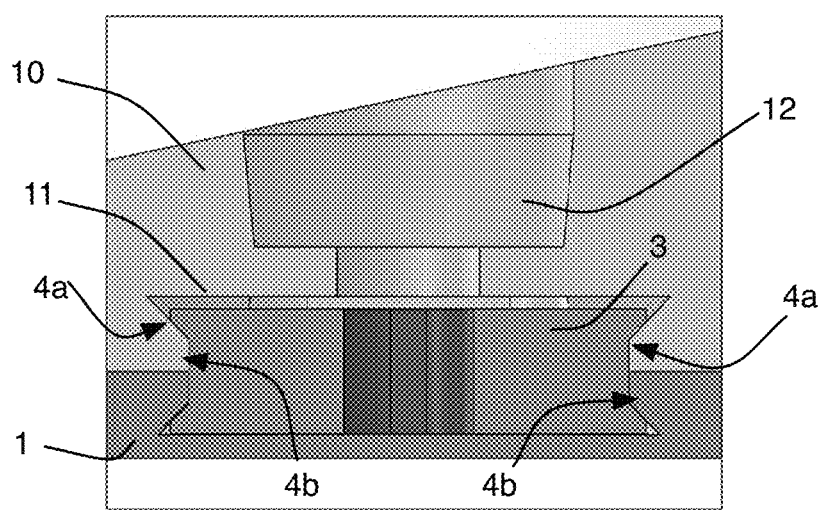
FIG. 4 is a side view of the fixing pin of FIG. 3.

The recess 2, which is also oblong, has two curved edges with convex faces 4b, the profiles and dimensions of which are substantially complementary to curved edges with concave faces 4a of the pins, so as to allow the pin 3 to cooperate in the locking mode with the recess 2, as shown in the example of FIG. 4.

FIG. 4 also shows an example of integrating a pin into a tyre characteristic sensor housing 10. In this example, the housing 10 comprises a pin receiving surface 11 glued to the top of a pin 4. This surface is mounted free to rotate to be able to adopt the same angular position as the pin. A hollow barrel 12 allows access to the opening 6 of the pin with the aid of a suitable tool, as previously described.

The solution is sized to withstand the braking of a truck at 70 km/h, and hundreds of thousands of axle drive-over events. The choices of material and geometry of the pin 3 and the plate 1 are provided to withstand mechanical stresses, in particular shearing, compression, and hammering effects. The plate is advantageously made of a plastic material that has low water absorption and is resistant to hydrocarbons. In addition, the choice of a plastic makes it possible to have excellent electrical permittivity, magnetic permeability and low dielectric losses.

The pins 3 are advantageously made of a thermoplastic polymer such as PBT, preferably with a glass-fibre filler. In variants, it is also possible to use pins made of PET, PMMA, PC, or polyamide, preferably with a filler.

The plate 1 is advantageously made of glass-fibre reinforced polyester (GPO3). Preferably, a material of the plate 1 that has a hardness higher than that of the pin is provided, as a result of which degradation of the pins 3 will occur before that of the plate 1. Indeed, replacing the pins 3 is simple and economical compared to replacing the plate 1. GPO3 is also a material having low surface tension, with good porosity and good affinity to many bonding resins.

Figure 5:
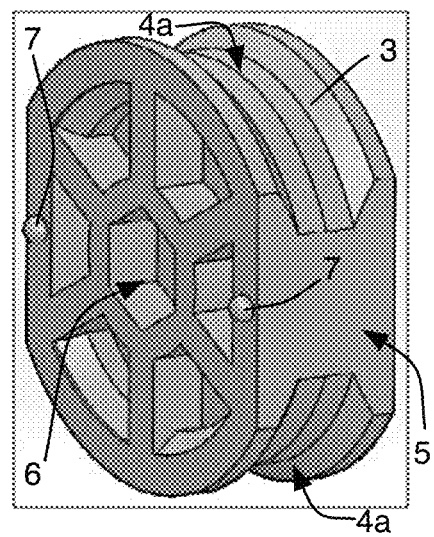
FIG. 5 is a perspective view of an exemplary fixing pin with an immobilizing system with studs.
Figure 6:
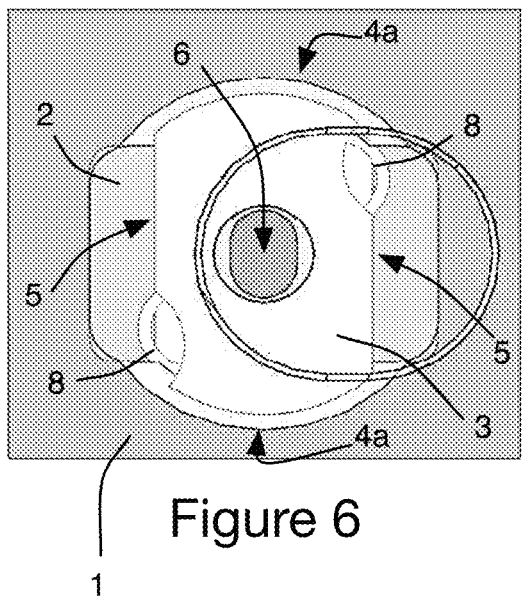
FIG. 6 is a top view of another exemplary fixing pin with a locking system having a flexible strip.
Figure 7:
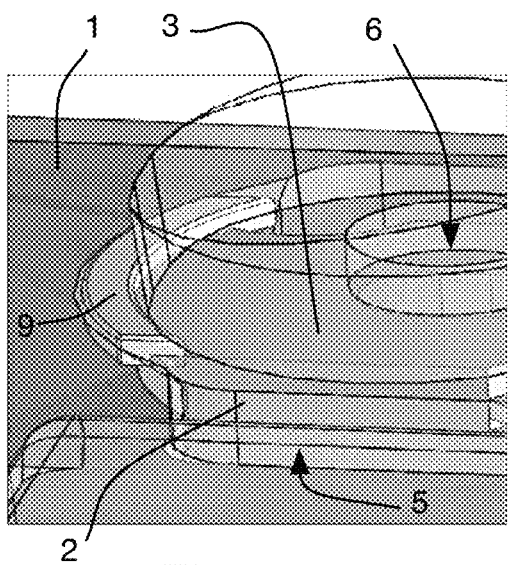
FIG. 7 is a perspective view of another example of a fixing pin with an immobilizing bar.

FIGS. 5, 6 and 7 show the pins 3 with "anti-rotation" solutions to avoid any unwanted rotation, for example during vibrations due to vehicles driving over. FIG. 5 illustrates a first solution in which the injected pin 3 comprises immobilizing studs 7. In the example, the studs 7 are two protuberances, distant from one another and arranged at the periphery of the pin. The pins are located on the face of the pin 3 in contact with the ground. The material used makes it possible to have a high coefficient of friction and prevents the pin 3 from rotating despite the vibrations caused during use of the sensor housing 10. This serves to prevent unintentional unlocking of the pins 3.

FIGS. 6 and 7 are variants of anti-rotation means. Locking blades 8, illustrated in the example of FIG. 6, act as a spring to allow the sensor housing 10 to be mounted and/or removed, while avoiding rotation of the pin 3. In this example, the blades 8 are disposed at the intersection of the straight edge 5 and the convex edge 4 of the pin.

FIG. 7 shows an immobilizing bar 9 having a high coefficient of friction. In this example, the bar is made by bi-injection of EPDM material, with a hardness of 30 Shore A. The bar 9 is arranged on a convex edge 4 of the pin 3.

Figure 8:
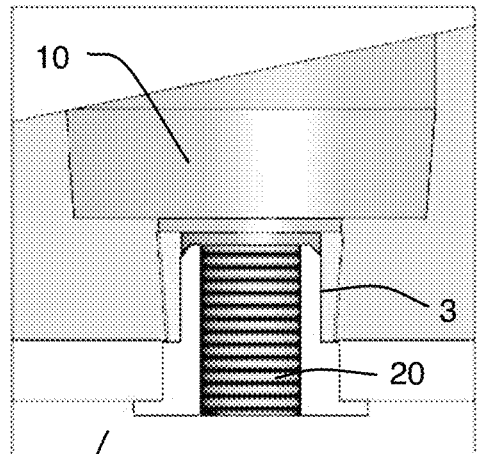
FIG. 8 illustrates another type of fixing pin.

FIG. 8 is a variant of the method by which the sensor housing 10 is fixed to the plate 1. The pin 3 has an opening with a threaded metal insert 20 fitted into the plate. In this example, a conical wedge makes it possible to adjust the positioning according to the manufacturing tolerance of the sensor.

REFERENCE NUMERALS EMPLOYED IN THE FIGURES

1. Fixing plate
2. Oblong recess
3. Fixing pin
4a. Concave edges of the pin
4b. Convex edges of housing
5. Substantially straight and mutually parallel edges
6. Opening
7. Immobilizing studs
8. Flexible immobilizing strip
9. Friction bar
10. Tyre characteristics sensor housing
11. Pin receiving surface
12. Hollow barrel 13. Tyre
14. Vehicle
20. Threaded insert

The invention claimed is:

1. A ground-fixing system for a tire characteristics sensor housing, the system being designed to withstand severe stresses associated with vehicles driving over the sensor housing, and the system comprising:
   (i) a fixing plate comprising a plurality of recesses of a given profile distributed over a surface of the fixing plate;
   (ii) a plurality of fastening pins suitable for cooperating with the profiles of the recesses of the fixing plate, similarly distributed on a fixing face of the sensor housing with a degree of freedom in rotation so as to allow the fastening pins to be inserted and immobilized by simple rotation in the corresponding recesses,
   wherein shapes and dimensions of the recesses and of the fastening pins being provided so as to allow, in an insertion position of the fastening pins, engagement of the fastening pins in the recesses and, in a locking position of the fastening pins resulting from a rotation of the fastening pins, fixing of the sensor housing on the fixing plate,
   wherein the length of the fixing plate is greater than that of the measurement housing that is to be fixed, and the number of recesses is greater than the number of pins to be received in order to allow the housing to be positioned at a plurality of locations along the longitudinal axis L-L of the fixing plate, and
   wherein the fixing plate is fixed to the ground.

2. The system according to claim 1, wherein an angular difference between the insertion position and the locking position is less than 300 degrees.

3. The system according to claim 1, wherein the given profile is oblong, star-shaped, cross-shaped, or T-shaped.

4. The system according to claim 1, wherein the given profile is oblong, and
   wherein each fastening pin comprises two edges that are substantially straight and mutually parallel and two substantially opposite curved edges with concave faces.

5. The system according to claim 1, wherein the shapes and dimensions of the recesses of the fixing plate are suitable for the insertion of a fastening pin and for locking the fastening pin by rotation of substantially a quarter turn.

6. The system according to claim 1, wherein the recesses have an oblong profile with two curved edges with convex faces, profiles and dimensions substantially complementary to the curved edges with concave faces of the fastening pins, to allow a fastening pin to cooperate, in the locking position, with a recess.

7. The system according to claim 1, wherein each fastening pin comprises at least one immobilizing means limiting or preventing rotation.

8. The system according to claim 7, wherein the at least one immobilizing means consists of a plurality of studs disposed on a face opposite the sensor housing.

9. The system according to claim 7, wherein the at least one immobilizing means consists of at least one flexible immobilizing strip.

10. The system according to claim 7, wherein the at least one immobilizing means consists of at least one friction bar.

11. The system according to claim 1, wherein the fixing plate has a width greater than a width of the sensor housing, the plurality of recesses being distributed over substantially the entire width of the fixing plate.

* * * * *